Oct. 17, 1967 R. C. BERRY 3,348,103
CLASS 1, DIVISION 2, PANEL BOARD
Filed Sept. 12, 1966 4 Sheets-Sheet 1
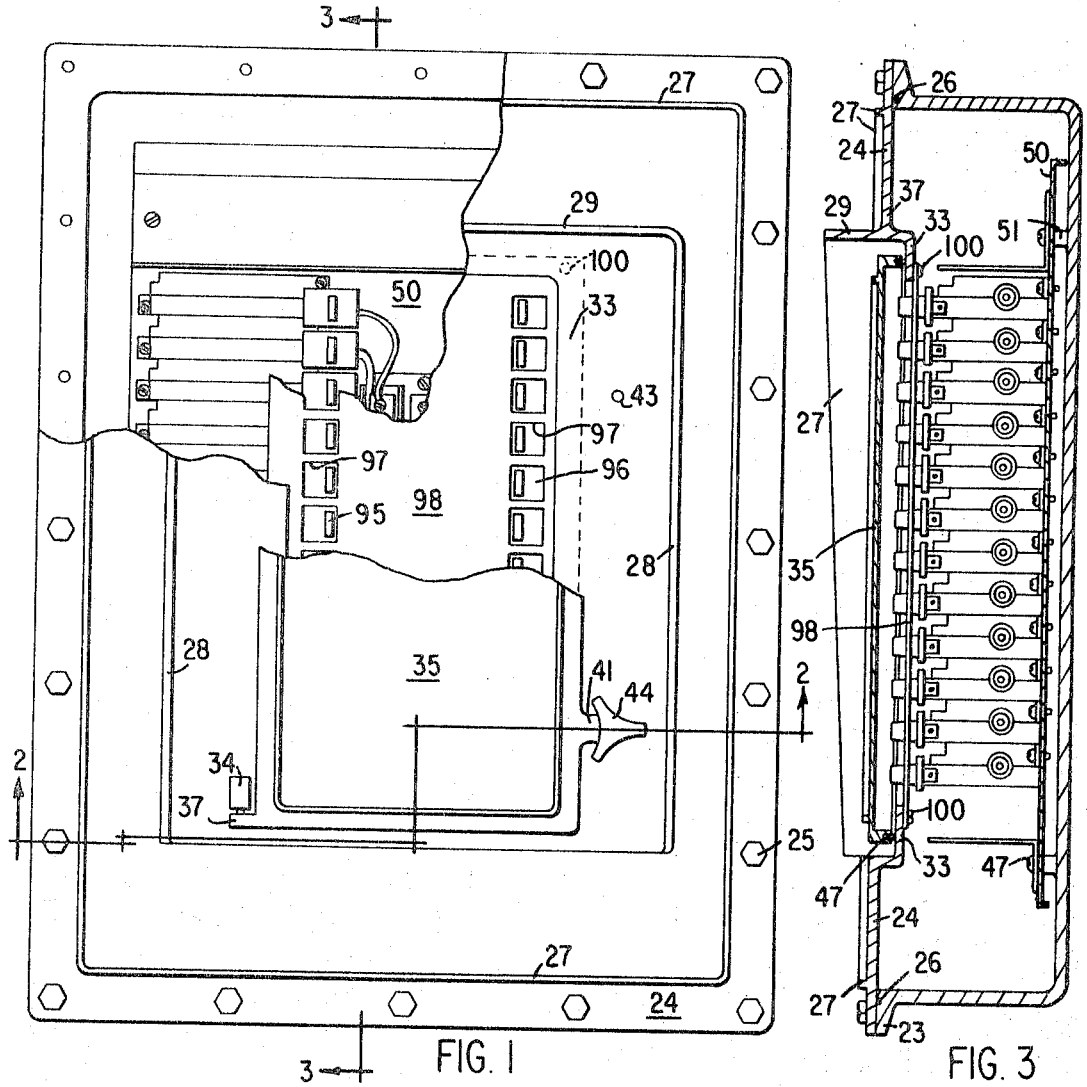
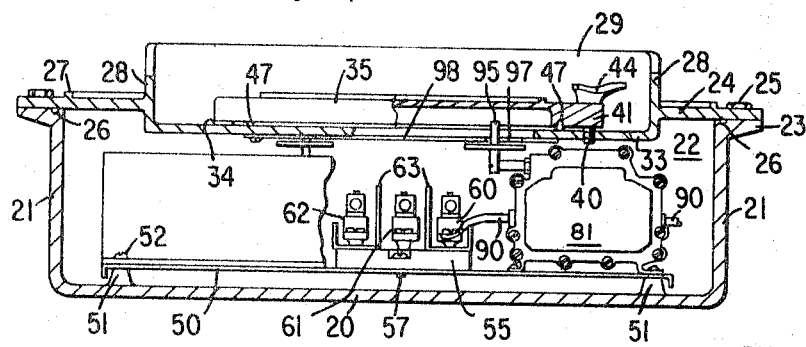
INVENTOR.
RICHARD C. BERRY.
BY
D. Emmett Thompson
ATTORNEY.

INVENTOR.
RICHARD C. BERRY.
BY
*D. Emmett Thompson*
ATTORNEY.

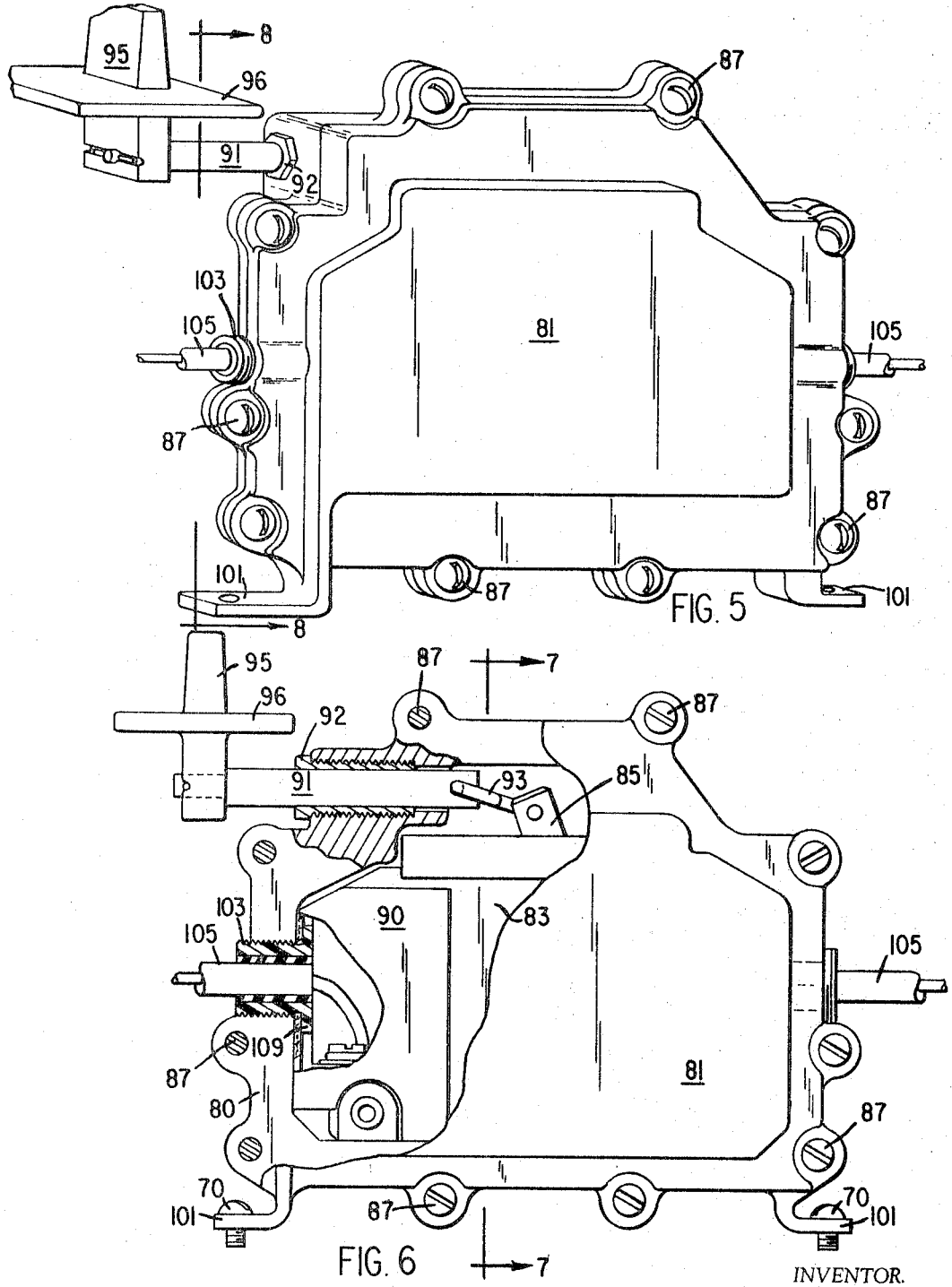

United States Patent Office 3,348,103
Patented Oct. 17, 1967

3,348,103
CLASS 1, DIVISION 2, PANEL BOARD
Richard C. Berry, Camillus, N.Y., assignor to Crouse-Hinds Company, Syracuse, N.Y., a corporation of New York
Filed Sept. 12, 1966, Ser. No. 578,661
3 Claims. (Cl. 317—120)

ABSTRACT OF THE DISCLOSURE

A distribution panel board for Class 1, Division 2, installations, the individual switching devices being each closely encompassed by an explosion proof housing formed of material having relatively high heat conductivity.

---

This invention has to do with electrical distribution panels, and more particularly to a panel, or installation, in Class 1, Division 2, locations.

The National Electrical Code classifies certain locations as hazardous. These hazardous locations are of various types, such as Class 1, Division 1; Class 2, Division 2, etc. Class 1, Division 1, locations are rated as the most hazardous, and the Code requires that all electrical equipment installed in such a location shall be confined in explosion proof enclosures. The explosion proof enclosures are of considerable size and weight in order to function properly and especially to withstand high internal pressures in the event of an explosion within the enclosure. Accordingly, explosion proof enclosures, particularly for circuit interrupting components, such as switches, circuit breakers, motor starters, etc., are very expensive, and are more expensive to install, maintain and repair. This is particularly true in regard to distribution panels embodying a plurality of switching devices.

Class 1, Division 2, locations are those in which a hazardous condition will not be likely to take place under normal operation, but may take place because of accident, or faulty operation. In such locations, the code requires, among other things, that all devices capable of producing an arc shall be confined in explosion proof enclosures of the type required in Class 1, Division 1, locations, unless the arcing contacts are contained within a hermetically sealed chamber, or are oil immersed. These two exceptions are not readily applicable to a panel board assembly and, in any event, if used, are also expensive. At the present time, this requirement for Class 1, Division 2, locations means that the expensive explosion proof equipment required for Class 1, Division 1, locations must be purchased and installed.

This invention has as an object an electrical distribution panel board comprising a low cost, general purpose type cabinet in which are installed circuit controllers including switching devices having arc producing contacts, such as switches, or circuit breakers, each switching device being enclosed in a compact explosion proof enclosure occupying only little additional space compared to the conventional unenclosed device, the arrangement being such that the circuit controllers can be installed and connected to the panel bus bars with the same ease and convenience as conventional unenclosed devices, all whereby the distribution panel of my invention, meeting the requirements for Class 1, Division 2, installations, costs only a fractional part of the explosion proof type panel now of necessity employed in Class 1, Division 2, locations.

Thermal operated circuit breakers are used extensively for branch circuit protection in panel boards. The code provides the total load on any over current device of the thermal type located in a panel board shall not exceed 80% of its rating where, in normal operation, the load will continue for three hours, or more. The reason for this requirement is that under continuous full load duty, the circuit breaker develops heat, causing it to trip out under a current load below the rated capacity of the breaker. This "nuisance tripping" happens frequently in panels where a number of breakers are mounted in close side by side relation in a single cabinet. To avoid this nuisance tripping, it is necessary to install breakers having a higher rating adding additional expense of the installation.

This invention has as a further object a circuit controller of the circuit breaker type embodying an arrangement wherein the breaker enclosure acts as a heat sink to conduct heat from the breaker, maintaining the same at a temperature at which the breaker will not trip out until the current in the circuit reaches the value of the breaker rating.

The invention consists in the novel features and in the combinations and constructions hereinafter set forth and claimed.

In describing this invention, reference is had to the accompanying drawings in which like characters designate corresponding parts in all the views.

In the drawings:

FIGURE 1 is a front elevational view of a distribution panel embodying my invention, with portions broken away.

FIGURE 2 is a view taken on line 2—2, FIGURE 1.

FIGURE 3 is a view taken on line 3—3, FIGURE 1.

FIGURE 5 is a view in perspective of one of the circuit controllers.

FIGURE 6 is a side elevational view of a circuit controller with a portion of the enclosure removed and with parts shown in section.

Figure 4:
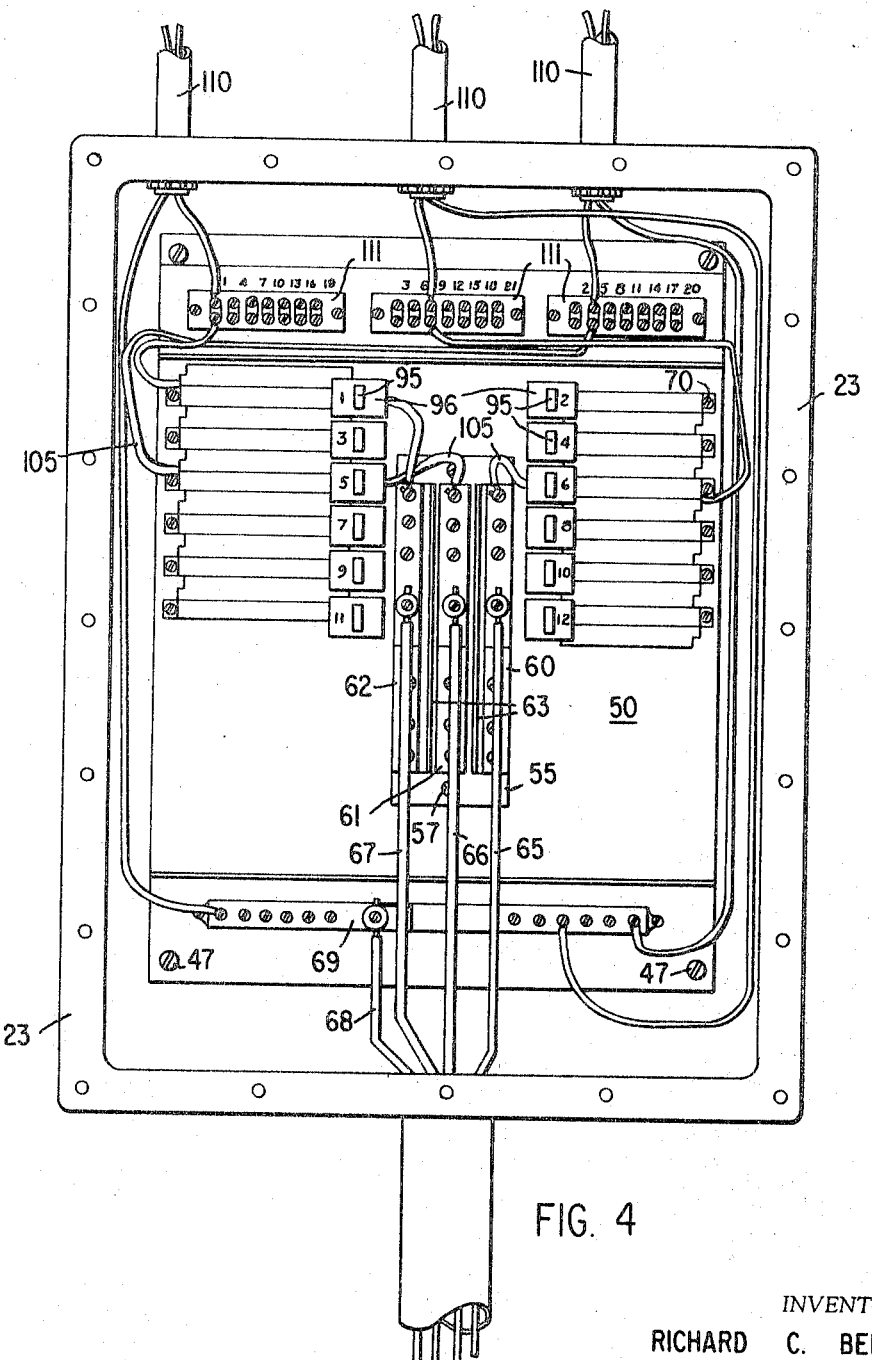
FIGURE 4 is a front view of the panel, with the door frame removed.
Figure 8:
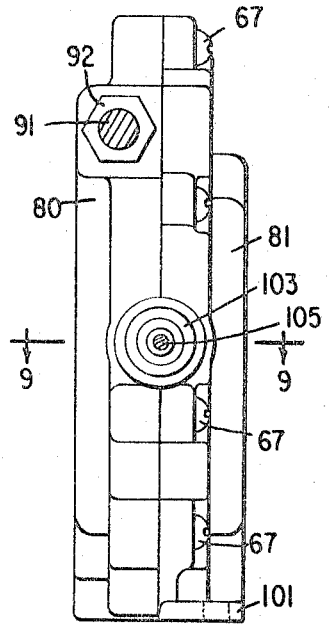
FIGURE 8 is an end elevational view of the circuit controller indicated by the line 8—8, FIGURE 5.
Figure 7:
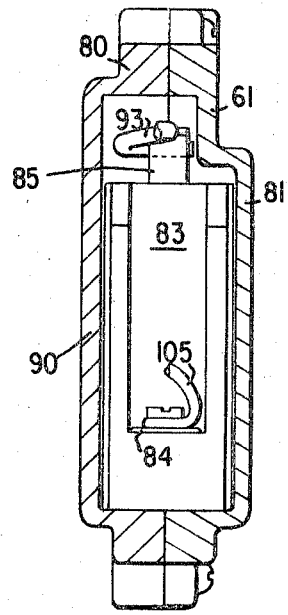
FIGURE 7 is a sectional view of the enclosure taken on line 7—7, FIGURE 6, and showing the circuit breaker in end elevation.
Figure 9:
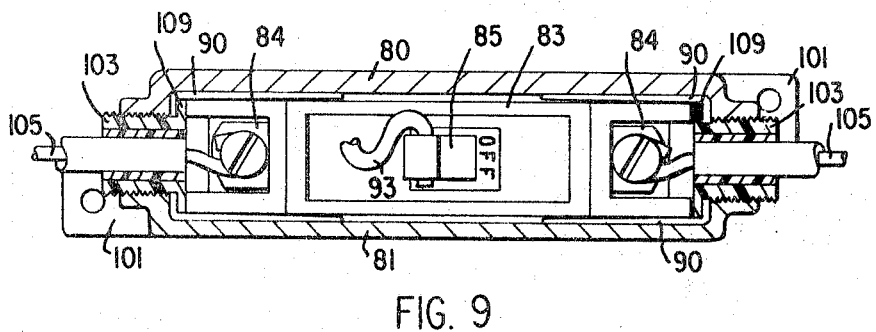
FIGURE 9 is a sectional view of the circuit controller enclosure taken on line 9—9, FIGURE 8, and showing the breaker in top plan.

The distribution panel consists of a cabinet having a flat bottom wall 20 and upstanding side walls 21, and end walls 22. The cabinet is of rectangular form and the side walls and end walls 21, 22, terminate at their upper edges in an outwardly flaring flange 23. The marginal area of a door frame 24 is detachably fixed to the flanges 23, as by cap screws 25. The marginal surface of the frame 24, adjacent the periphery thereof, is formed on its under surface with a groove to accept a gasket 26. The door flange is also formed with an integral trim rib 27 and there are vertically disposed flanges 28 inclined relative to the plane of the frame 24 and which merge at their upper ends with a flange 29, see FIGURES 1 and 3.

The door frame 24 is formed with a central rectangular opening encircled by a flange 33, which is positioned in a plane below or inwardly of the frame 24. The frame is formed with bosses 34 at one side of the central opening, and a door 35 is formed with complemental bosses 37 hinged on the bosses 34. The door 35, when in closed position, overlies the flange 33 and is maintained in closed position by studs 40 journalled in bosses 41 formed on the free edge of the door, the studs threading into apertures 43 formed in the flange 33. The studs are provided with operating knobs 44. The door is also formed on its under side with a groove to receive a gasket 47.

The cabinet may be formed out of sheet metal but, as shown, it is made up of cast metal parts. The gaskets 26, 47, render the cabinet assembly weather tight. The flanges 27, 29, serve to direct dripping moisture from the door area.

A mounting plate 50 is fixed to bosses 51 formed on the inner surface of the cabinet bottom wall 20. The plate is fixed to the bosses, as by screws 52.

There is a bus bar assembly mounted on the plate 50 and extending centrally of the cabinet. This assembly consists of an insulating block 55, FIGURES 2 and 4, fixed to the plate 50, as by screws 57. In the circuit arrangement disclosed, there are three bus bars 60, 61 and 62, mounted on the block 55. There are insulating partitions 63 extending between the central bus bar 61 and the outer bus bars 60, 62. Supply feeders 65, 66, 67, are connected to the bus bars 60, 61, 62. The neutral conductor 68 is connected to the terminal block 69.

There are a number of circuit controllers shown in FIGURES 5 to 9, mounted on the plate 50 by screws 70 at each side of the bus bar assembly. Each circuit controller consists of an explosion proof enclosure formed of heat conducting material and containing a switching device having contacts that produce arcing in the operation of the device.

The enclosure consists of a body member formed with a cavity and having a flame tight closure for the cavity. The inner surface areas of the cavity and closure are so shaped and dimensioned as to closely encompass the switching device in heat exchanging relation thereto. The enclosure is formed of heat conducting material having a thermal conductivity greater than about 50 B.t.u. per hour, per feet square, per feet thick, per degree Fahrenheit. The enclosure depicted in the drawings is formed of cast aluminum and consists of a body section 80 and a closure section 81. In the form shown, the sections 80, 81, are complemental mating sections wherein the closure section 81 is shaped and dimensioned to form part of the cavity in which the switching device 83 is mounted. However, the body 80 may be formed with the cavity therein of sufficient depth to fully accommodate the switching device, in which event the closure section 81 would take the form of a flat plate. The switching device may be in the form of a switch, a circuit breaker, a motor starter, or the like. The device shown is a thermal trip circuit breaker, Catalog No. QCL1020, manufactured by the Westinghouse Electric Corporation, and is generally of conventional structure having terminals 84 and an operating handle 85.

The complemental mating sections 80, 81, have planar abutting surfaces and are secured together by a plurality of fasteners, such as screws 87. In this arrangement, the recess in the body section 80 and the recess in the closure 81, are shaped and dimensioned to so form the cavity that the breaker substantially fills the cavity, with the exception that there is of necessity some clearance space in the top portion of the enclosure to permit movement of the operating handle 85. A piece of sheet insulating material 90 is positioned about each end of the breaker.

The contacts of the breaker are moved into and out of engagement by an actuator in the form of shaft 91, which is slidably mounted in a bushing 92 threaded in an aperture in the top portion of the body section 80. The clearance between the shaft 91 and the bushing 92 is such as to make the assembly flame tight in compliance with the code. The inner end of the shaft 91 is operatively connected to the handle 85 by an S link 93.

It will be apparent that upon reciprocation of the shaft 91, the handle 85 is moved into the on and off positions. A finger piece 95 is fixed to the outer end of the shaft 91 and is provided with a plate 96. The finger pieces 95 extend upwardly through apertures 97 formed in a closure plate 98 which is secured to the door frame flange 33, as by screws 100, see FIGURES 1, 2 and 3. The plates 96 are dimensioned larger than apertures 97 to form closures therefor. The mating sections 80, 81, are formed with foot bosses 101 which are positioned on the mounting plate 50 and attached thereby by the screws 70.

The end walls of the explosion proof enclosure are apertured to receive bushings 103 which are provided with external ribs, or threads, mating with a comparable arrangement in the bore of the aperture in order to render the bushings in flame tight relation to the enclosure. Conductors 105 are connected to the terminals 107 of the breaker, and are permanently sealed in the bushings 103. The bushings extend through apertures formed in the insulation shields 90, the latter being maintained in place by head flanges 109 formed on the bushings, see FIGURE 9.

In FIGURE 4, the door frame has been removed from the cabinet showing twelve circuit breakers mounted in the cabinet. Three of the breakers are shown as wired to the bus bars 60, 61, 62, and to branch circuits in the outfeed conduits 110. It will be apparent that the breakers are quickly and conveniently installed in the cabinet by the screws 70. The self-contained conductors 105, sealed in each enclosure, are conveniently connected to the bus bars and the terminal block 111, this arrangement also providing for the convenient replacement of a circuit controller.

Due to the fact that the enclosure closely embraces the breaker, heat is rapidly conducted from the breaker, maintaining the same at a temperature which will not result in nuisance tripping of any of the breakers in the panel board.

Also, in view of the fact that the cavity of the enclosure is substantially filled by the circuit controller, the volume of explosive gas that may accumulate within the enclosure is so reduced that high pressure is not built up upon ignition of the gas. Accordingly, the strength of the enclosure does not need to be so great, with the result that the side wall thickness of the enclosure is reduced to a minimum whereas, the explosion proof enclosed breaker occupies only little additional space compared with the conventional unenclosed breaker. Accordingly, a substantial number of these breakers can be mounted in a cabinet of conventional size to provide a panel board for Class 1, Division 2, locations.

What I claim is:

1. An electrical distribution panel comprising a cabinet, a plurality of individual circuit controllers mounted in said cabinet, each of said circuit controllers comprising a flame tight explosion proof enclosure formed of heat conducting material having a thermal conductivity greater than about 50 B.t.u. per hour, per foot square, per foot thick, per degree Fahrenheit, a switching device mounted in said enclosure and having arc producing contacts connected to terminals, the inner surface areas of said enclosure being shaped and dimensioned to closely follow the contours of said switching device in heat exchanging relation thereto, an actuator mounted in flame tight relation in said enclosure and being operable externally thereof for moving the contacts of said switching device into and out of engagement, conductors connected to the terminals of said switching device and extending externally of said enclosure, said conductors being sealed in flame tight relation in said enclosure.

2. A circuit controller comprising a body member formed with a cavity, a closure member overlying said cavity and being fixed to said body member in flame tight relation thereto and forming, in conjunction therewith, an explosion proof enclosure, a switching device mounted in said cavity and having arc producing contacts connected to terminals, the inner surface areas of said cavity and closure member being shaped and dimensioned to closely follow the contours of said switching device in heat exchanging relation thereto, said body member and closure member being formed of heat conducting material having a thermal conductivity greater than about 50 B.t.u. per hour, per foot square, per foot thick, per degree Fahrenheit, an actuator mounted in flame tight relation in said body member and being operable externally thereof for moving the contacts of said switching device into and out of engagement, conductors connected to the terminals of said switching device and extending externally of said body member, said conductors being sealed in flame tight relation in said body member.

3. A circuit controller as set forth in claim 2, wherein said body member and said closure member are in the form of complemental mating members.

References Cited

UNITED STATES PATENTS

| | | | |
|---|---|---|---|
| 2,335,233 | 11/1943 | Bush | 317—119 |
| 3,179,853 | 4/1965 | Kozacka | 317—100 |
| 3,236,989 | 2/1966 | Zavertnick et al. | 200—168 |
| 3,267,336 | 8/1966 | Kussy et al. | 317—120 |

ROBERT K. SCHAEFER, *Primary Examiner.*

M. GINSBURG, *Assistant Examiner.*